US011466870B1

(12) United States Patent
Shahsavar et al.

(10) Patent No.: US 11,466,870 B1
(45) Date of Patent: Oct. 11, 2022

(54) COMBINED HEAT, POWER, WATER AND WASTE SYSTEM

(71) Applicant: Innocorps Research Corporation, Saskatoon (CA)

(72) Inventors: Aarya Shahsavar, Saskatoon (CA); Adam Richard Clark, Saskatoon (CA)

(73) Assignee: Innocorps Research Corporation, Saskatoon (CA)

( * ) Notice: Subject to any disclaimer, the term of this patent is extended or adjusted under 35 U.S.C. 154(b) by 0 days.

(21) Appl. No.: 17/531,869

(22) Filed: Nov. 22, 2021

(51) Int. Cl.
| | |
|---|---|
| F24D 17/02 | (2006.01) |
| F28D 20/02 | (2006.01) |
| F28D 21/00 | (2006.01) |
| F24D 17/00 | (2022.01) |
| C02F 1/44 | (2006.01) |
| C02F 1/78 | (2006.01) |
| C02F 3/00 | (2006.01) |
| F28D 20/00 | (2006.01) |
| H02J 3/38 | (2006.01) |

(52) U.S. Cl.
CPC ............. *F24D 17/02* (2013.01); *C02F 1/441* (2013.01); *C02F 1/442* (2013.01); *C02F 1/78* (2013.01); *C02F 3/00* (2013.01); *F24D 17/0005* (2013.01); *F28D 20/0034* (2013.01); *F28D 20/02* (2013.01); *F28D 21/0012* (2013.01); *C02F 2209/02* (2013.01); *C02F 2209/03* (2013.01); *C02F 2209/40* (2013.01); *C02F 2303/04* (2013.01); *C02F 2303/10* (2013.01); *H02J 3/38* (2013.01); *H02J 2300/10* (2020.01)

(58) Field of Classification Search
None
See application file for complete search history.

(56) References Cited

U.S. PATENT DOCUMENTS

| | | | | |
|---|---|---|---|---|
| 6,266,975 B1* | 7/2001 | Assaf | ................... | F24F 5/0014 62/271 |
| 2007/0039345 A1* | 2/2007 | Forsberg | ................... | E03B 3/28 62/317 |
| 2011/0041536 A1* | 2/2011 | O'Brien | ................... | F25B 30/06 62/238.6 |
| 2011/0073460 A1* | 3/2011 | Chung | ................... | C02F 1/02 202/168 |
| 2015/0075967 A1* | 3/2015 | Zebuhr | ................ | B01D 1/2893 202/185.1 |

* cited by examiner

Primary Examiner — Richard C Gurtowski
(74) Attorney, Agent, or Firm — Michael D. Eisenberg

(57) ABSTRACT

An integrated utility system, comprising: at least one heat pump which includes a compressor for processing water mist from an evaporator and providing the water mist to a condenser; a thermal reservoir configured to contain water and operatively connected to the condenser; a heat management system configured to receive and process excess heat generated between the thermal reservoir and condenser. The heat management system comprises: a plurality of sensors for measuring water pressure, temperature and flow; at least one control valve for controlling movement of a thermal energy from thermal sources; at least one thermal sink; a thermal storage; a plurality of heat exchangers fluidly connected to the thermal sources, to the at least one thermal sinks, to the thermal reservoir and to a plurality of pumps configured to circulate a heat exchange fluid between the thermal sources, thermal reservoir and the at least one thermal sink.

12 Claims, 13 Drawing Sheets

Exemplary Humidification-Dehumidification Process

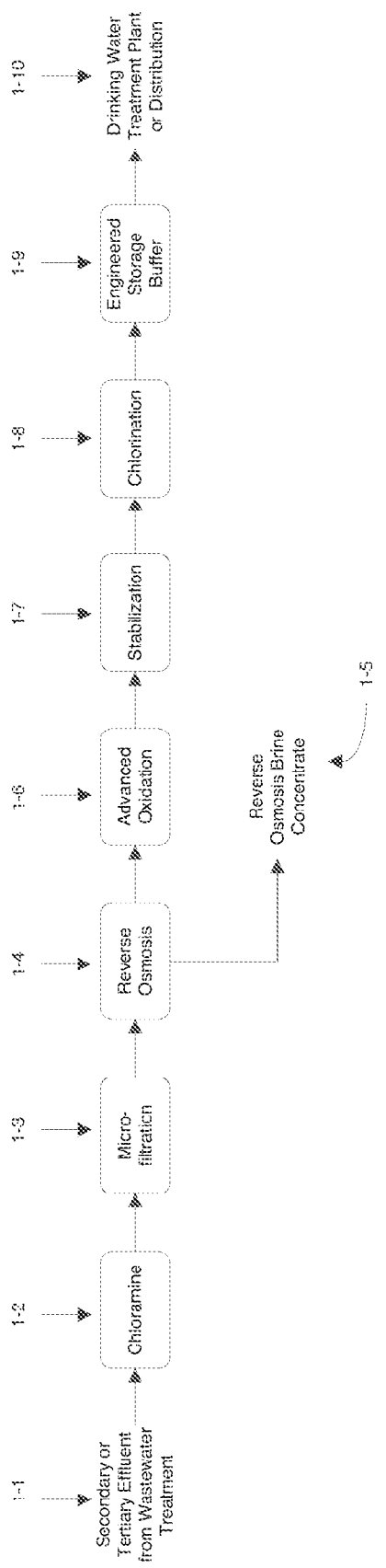
Fig. 1: Prior Art RO Based Treatment Train for Direct Potable Reuse

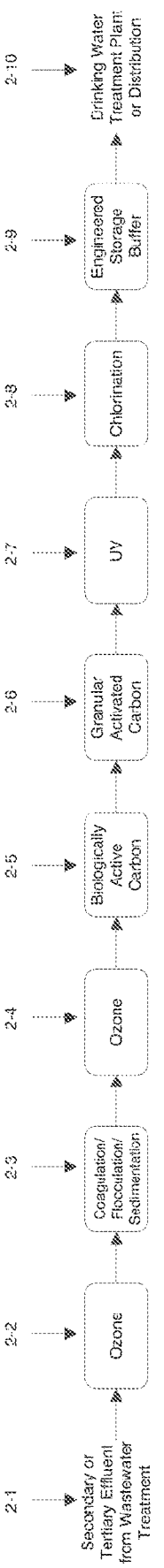
Fig. 2: Prior Art Non-RO Based Treatment Train for Direct Potable Reuse

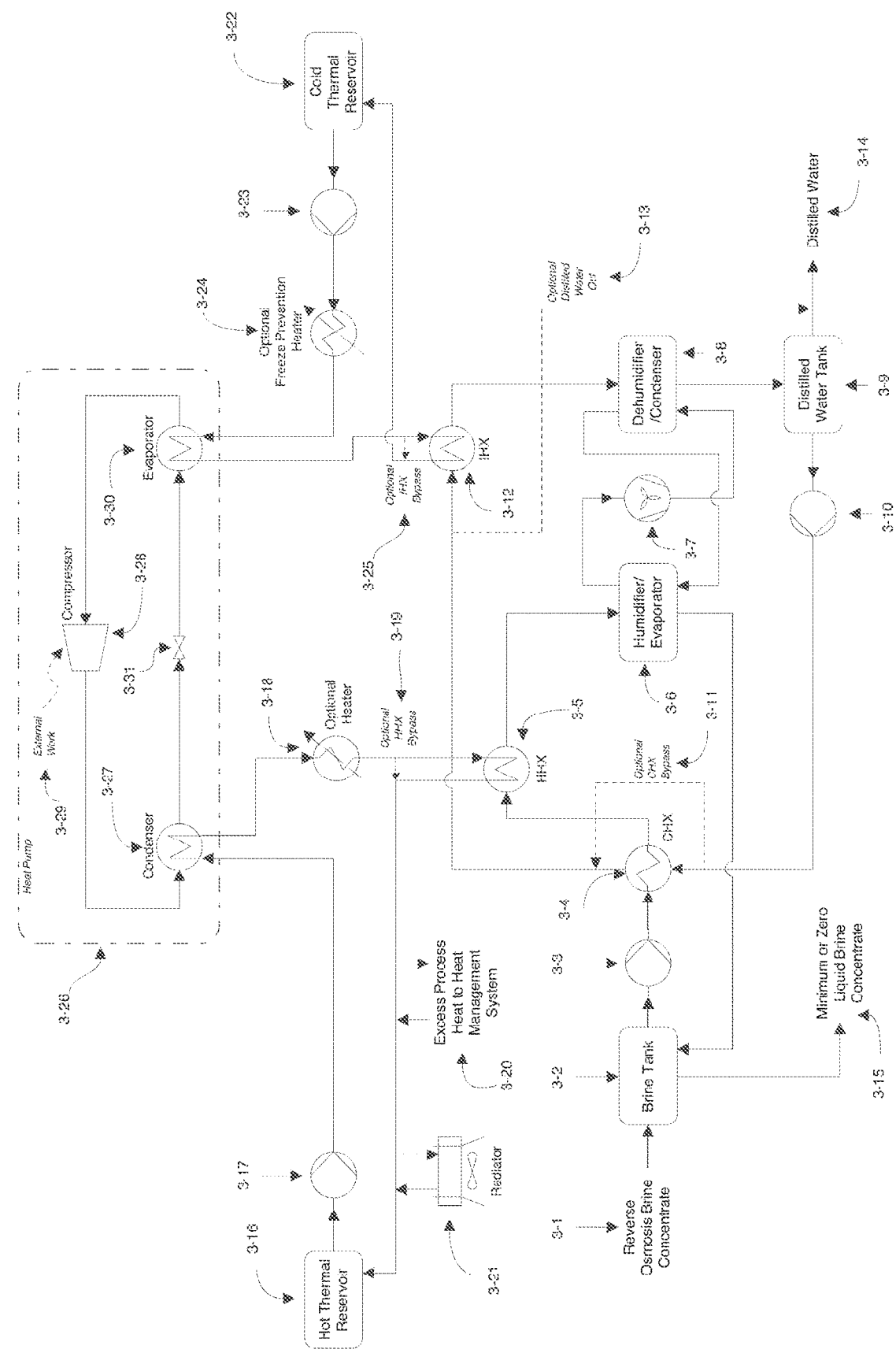
Fig. 3: Exemplary Humidification-Dehumidification Process

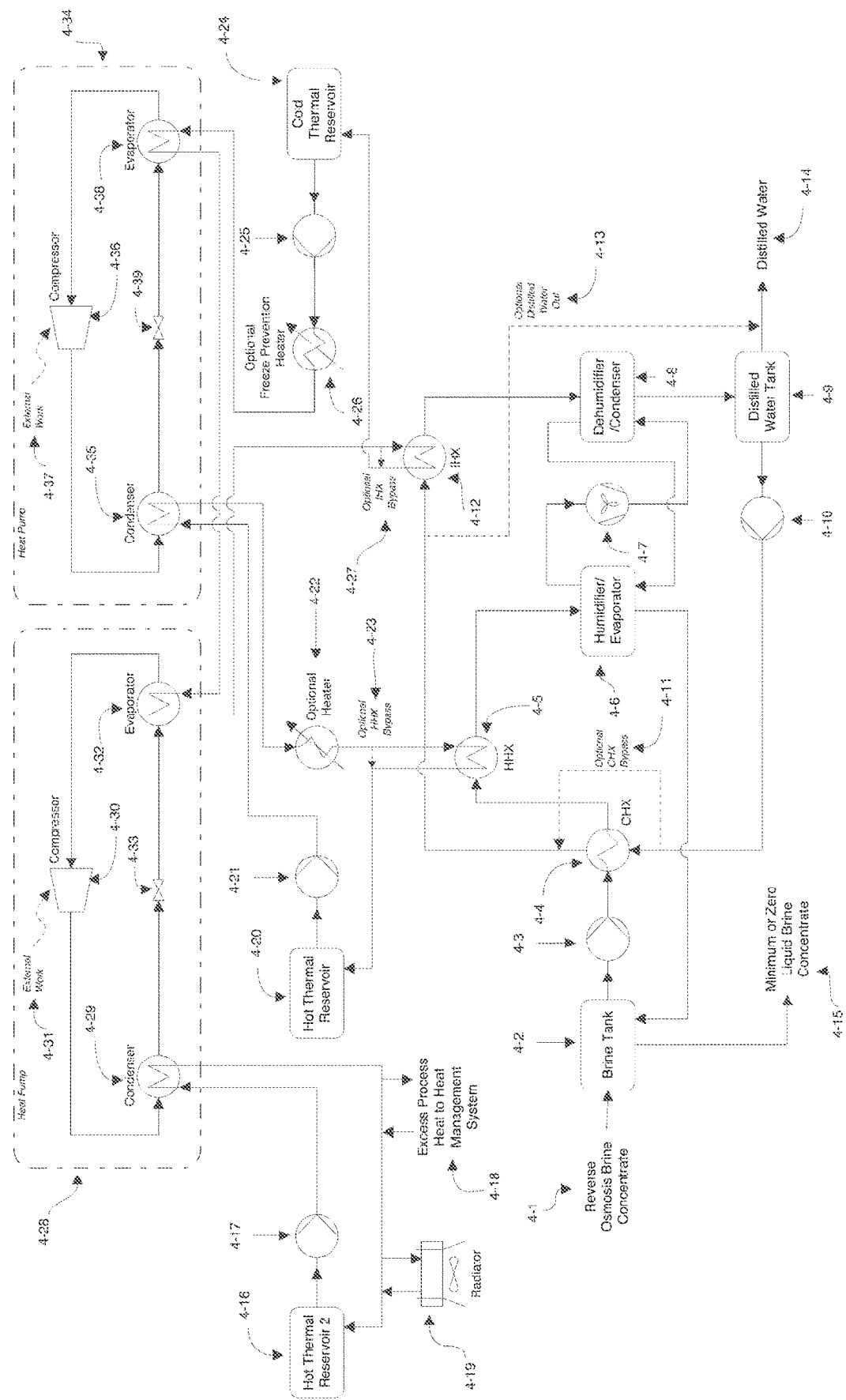
Fig. 4: Exemplary Humidification-Dehumidification Process with Improved Series-Parallel Heat Pump Configuration

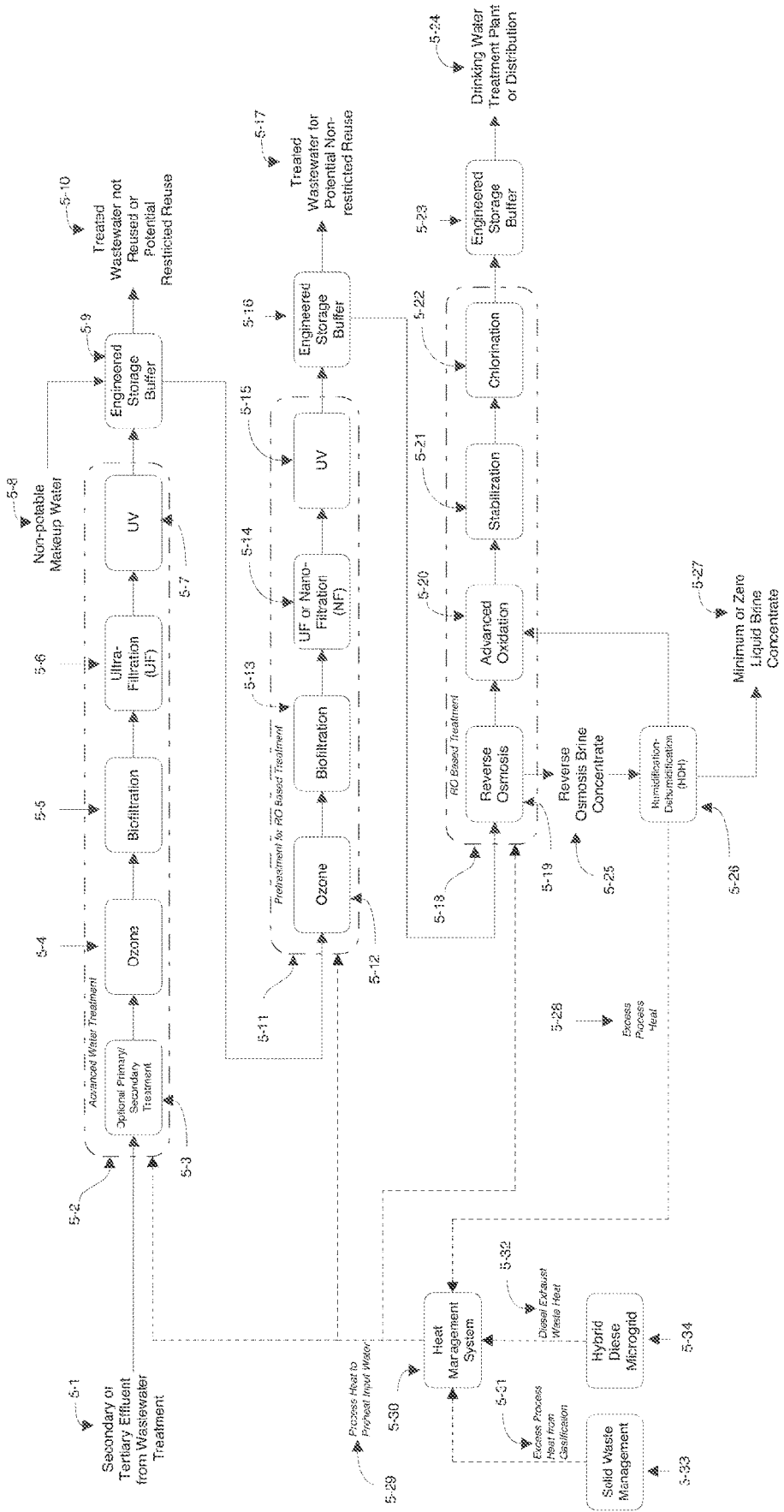
Fig. 5: Direct Potable Reuse of Wastewater

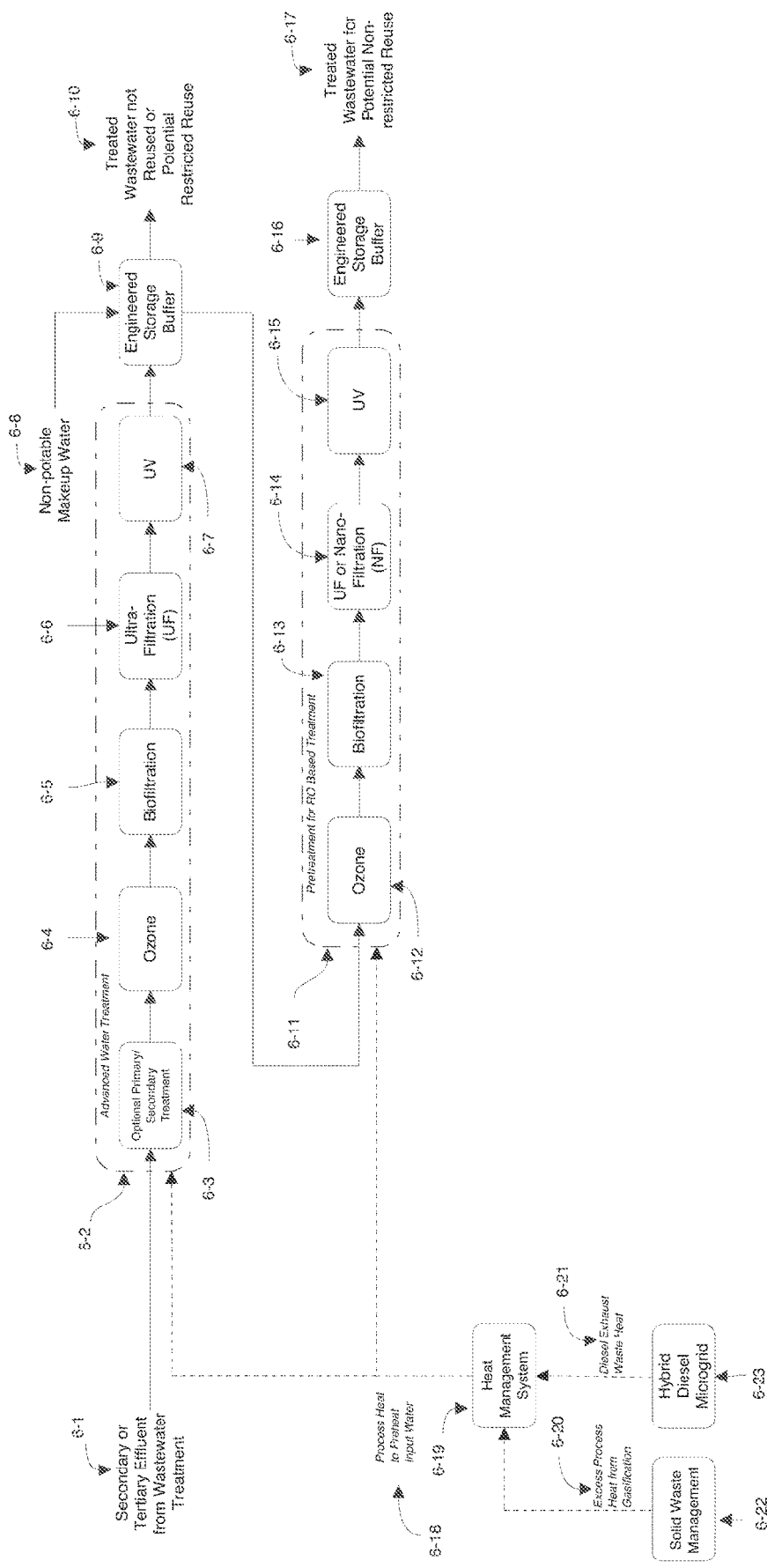
Fig. 6: Reuse of Wastewater

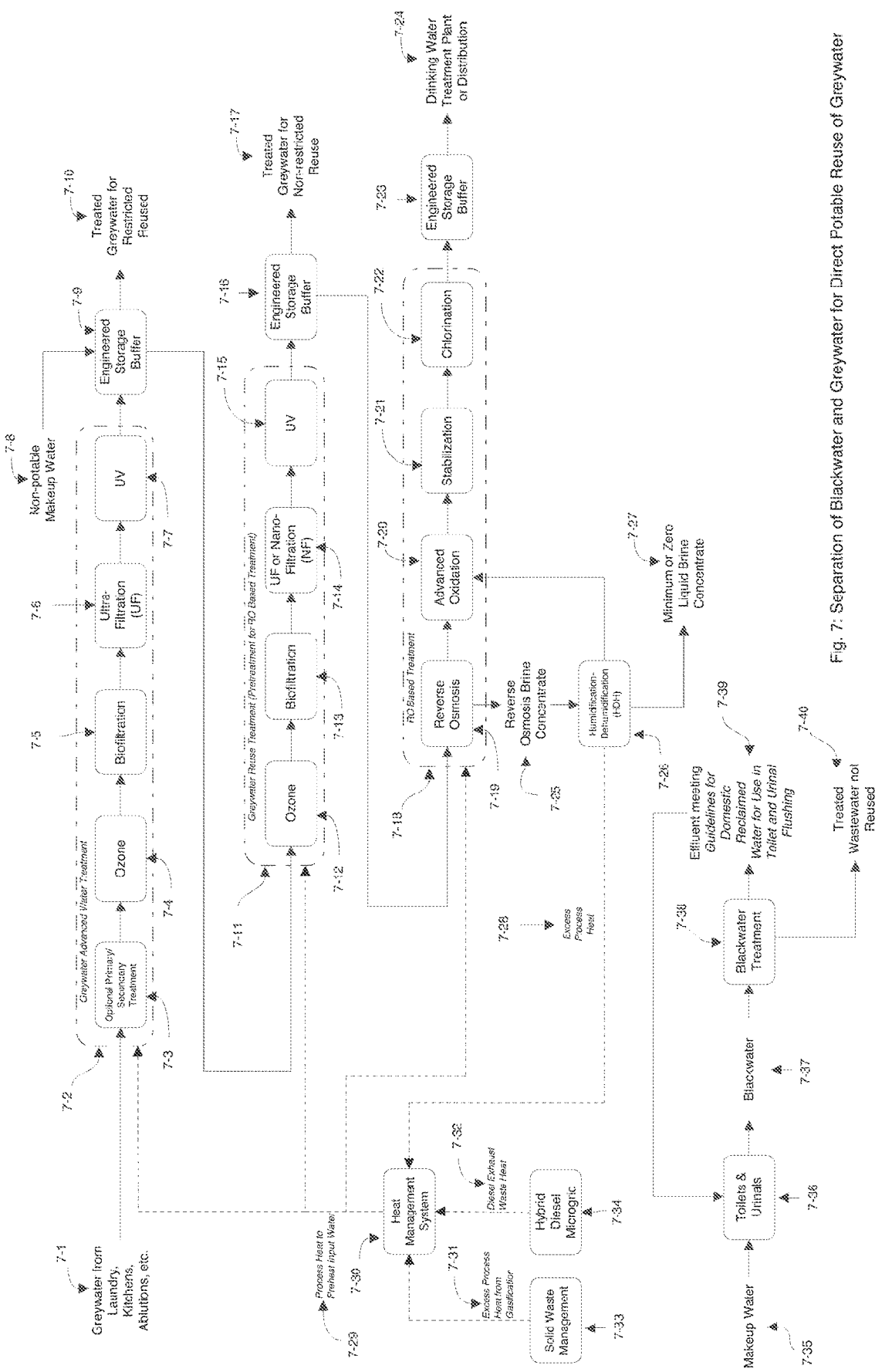
Fig. 7: Separation of Blackwater and Greywater for Direct Potable Reuse of Greywater

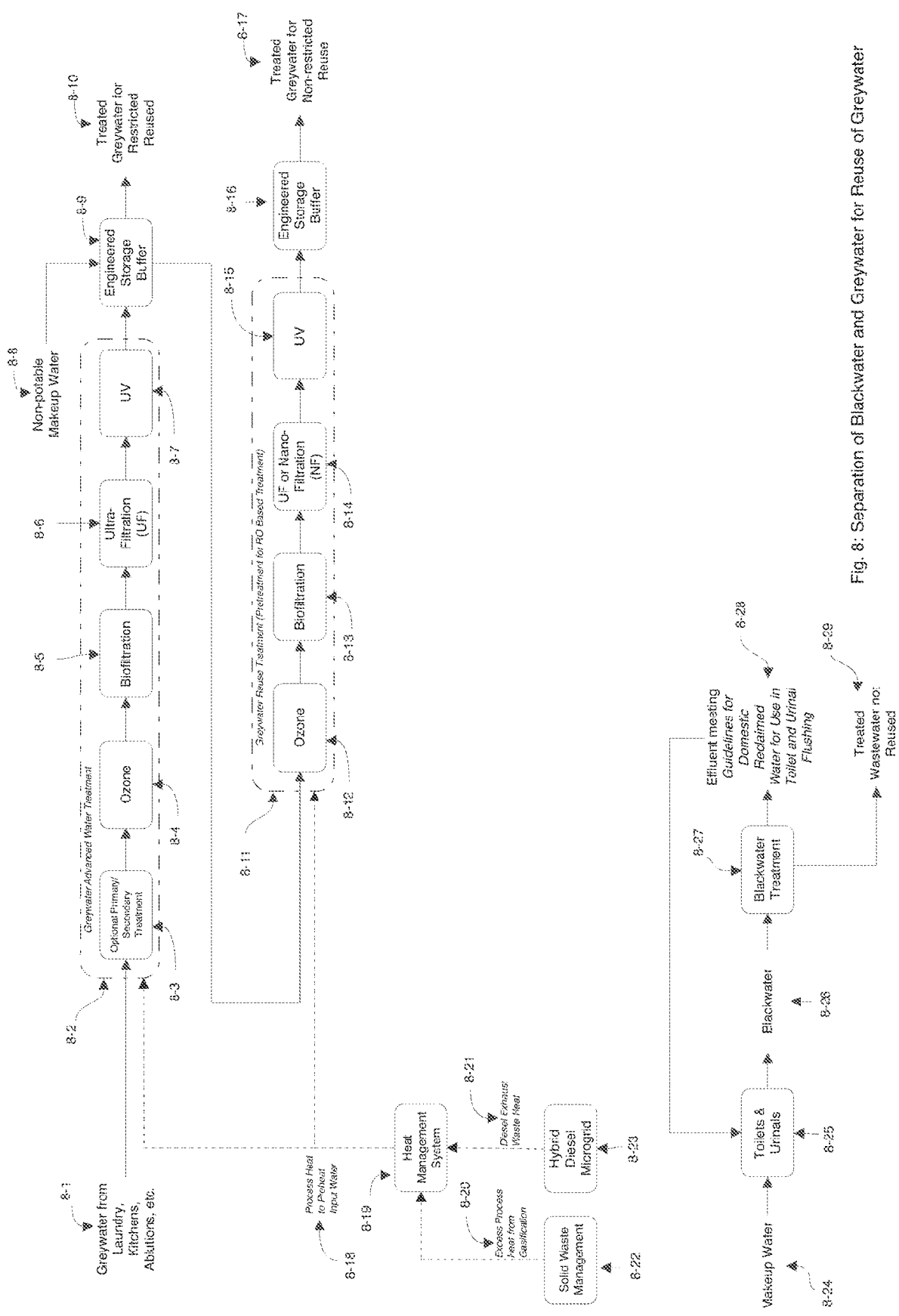
Fig. 8: Separation of Blackwater and Greywater for Reuse of Greywater

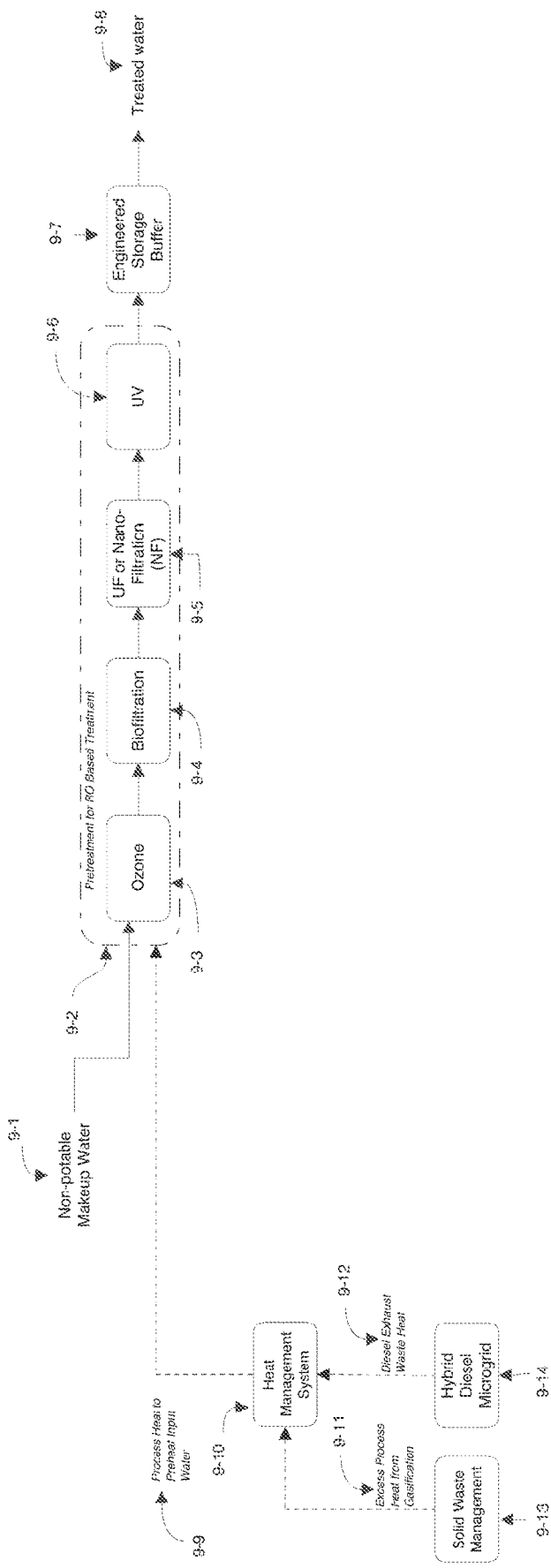
Fig. 9: Treatment of non-potable water

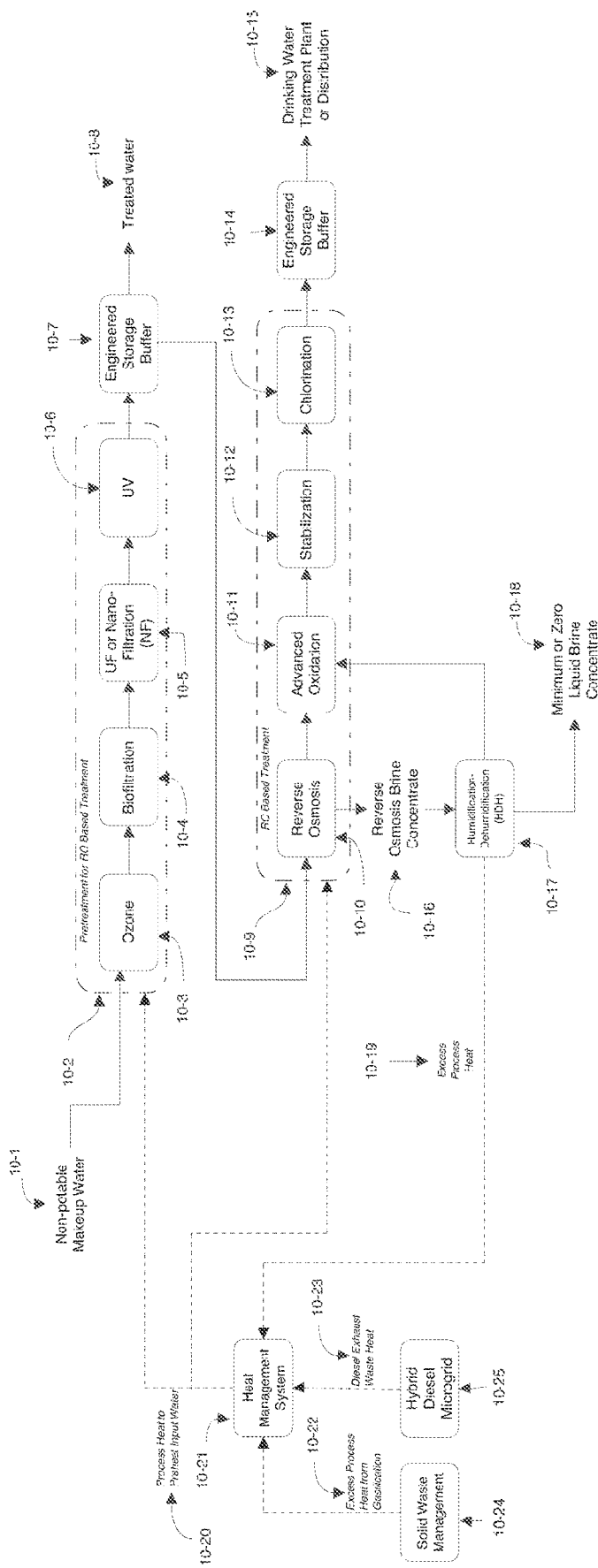
Fig. 10: Treatment and desalination of non-potable water

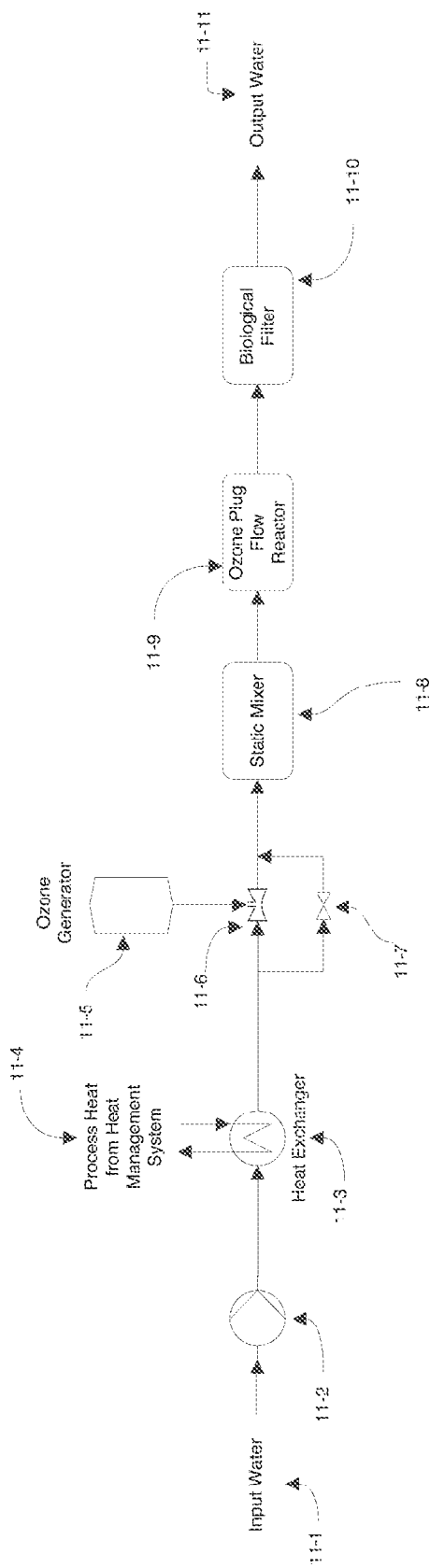
Fig. 11: Exemplary pre-heating arrangement for ozone and biological filtration

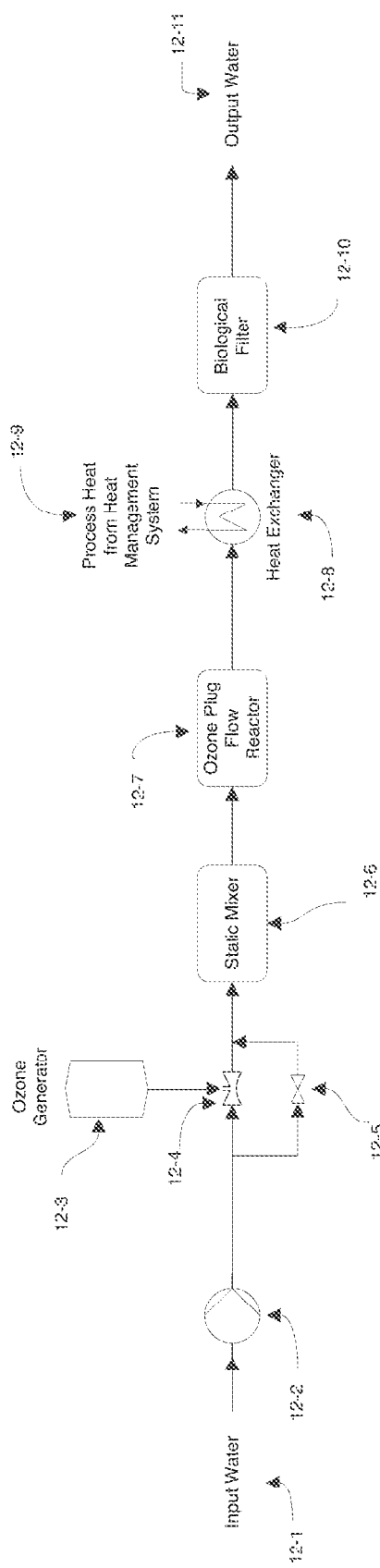
Fig. 12: Exemplary pre-heating arrangement for ozone and biological filtration

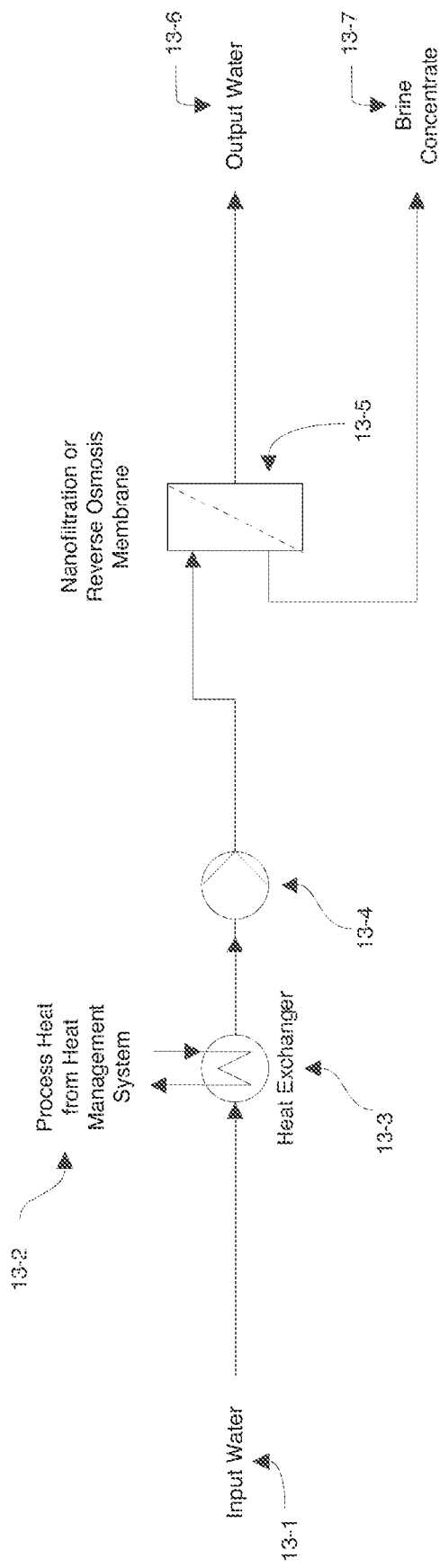
Fig. 13: Exemplary pre-heating arrangement for nanofiltration or reverse osmosis

COMBINED HEAT, POWER, WATER AND WASTE SYSTEM

TECHNICAL FIELD

This application generally relates to a system for water, waste and energy utilities and, more particularly, to system and methods of an integrated water, waste, and energy utilities for relocatable camps and remote communities.

BACKGROUND

Providing water, waste and energy utility solutions for people living in relocatable camps, remote communities and refugee camps that lack infrastructure is a significant operational challenge and costly. To support humans living and working in these relocatable camps and remote communities, potable water supply, wastewater treatment, solid waste management, electricity, shelter and heating, ventilation, and air conditioning (HVAC) utilities must be provided. When moving beyond Earth to the needs of future human habitations on other planets such as Mars, having reliable and complete utility systems becomes both life and mission critical. With increased exploration of resources required to support the on-going energy transition toward sustainable energy sources and electrical vehicles, commercial pressure from mines is increasing the demand for utility systems to support remote work camps. Militaries around the world already face the difficulty of supporting personnel on deployment in remote locations and have attempted to redress the problem.

For example, the Canadian Armed Forces (CAF) along with many other nations around the world rely on Relocatable Temporary Camps (RTCs) to sustain personnel through operations. Modular systems housed typically within 20 ft (6.1 m) intermodal containers must be deployable on short notice across a variety of climates, potentially for significant durations of time. Typically, these RTCs require water, waste, and energy utilities to support up to 1500 people. However, the population supported by the systems may vary considerably day to day. The RTCs currently employed consist of multiple independent systems for energy, water, and waste utilities. Each system has independently been optimized for efficiency. However, an optimization of the total utility systems required to support personnel in relocatable and remote communities has not been developed. For instance, conventional systems do not employ some form of energy integration between utilities, nor provide for any water reuse or recycling.

The conventional RTCs rely on multiple single speed diesel generators for electrical production, with load banks used to avoid low load operation, resulting in excess electricity being released to the environment as waste heat. Diesel-fired heaters are used for space heating of non-insulated canvas tents during cold weather operation. Electrical air-conditioning (AC) units are used to cool non-insulated canvas tents in summer months. Currently, a basic power load of 1.5 kW/person is required, resulting in an average fuel diesel fuel supplied per year of 2500 L/person/year consisting of 2000 L/person/year for electrical generation and 500 L/person/year for space heating.

Potable water is essential for inhabitants, therefore maintaining an adequate supply of potable water for the RTCs is mission critical. Typically, bulk potable water is hauled in and used for ablutions, laundry, showers, and kitchens, with bottled water for human consumption. Reverse osmosis water purification units (ROWPUs) may be employed to provide potable water from a locally available source of water, albeit at limited recovery ratio and energy efficiency. Furthermore, drilling water wells or accessing water from surface water sources may not be possible in areas that are experiencing high water scarcity. Currently, 150 L/person/day of potable water and 50 L/person/day of non-potable water (used for toilets, firefighting, dust control and other non-potable use cases) is hauled in per day for use at the RTCs.

Solid and liquid waste are not managed in an environmentally sustainable way at the RTC sites. Lagoons of greywater and blackwater store liquid waste before being hauled away for disposal when locally available at a wastewater treatment plant. Solid waste is managed by incineration or hauling away to a landfill. Currently, 89.5 L/person/day of blackwater and 48.5 L/person/day of greywater must be hauled away for wastewater treatment, while 1.1 kg/person/day of dry solid waste and 1.1 kg/person/day of wet solid waste is generated. Wet solid waste has a water content of 70%. Dry solid waste and dehydrated wet solid waste have an assumed energy content of 15 MJ/kg.

As a result of the current practice, there is a high requirement for fuel and water resupply, and waste removal. This results in a significant increase in transportation logistics costs, as well as a risk to military personnel when operating in a war zone. Moreover, reliability of these utility systems is potentially impacted by the difficulty of operating in regions that have difficult terrain to navigate, lack roads, or are impacted by extreme weather conditions, such as in circumstances of deployments for disaster relief.

Accordingly, what is desired is an integrated utility system that can provide at least a 33% reduction in the amount of diesel fuel delivered, at least a 33% reduction in hauled potable water, and at least a 33% reduction of hauled out liquid and solid waste without changing per capita consumption or generation amounts and behavior of personnel. It is desired that diesel fuel hauled in be reduced to 1650 L/person/year, potable water hauled in reduced to 100 L/person/day, blackwater hauled out reduced to 60 L/person/day, greywater hauled out reduced to 32 L/person/day, dry solid waste hauled out reduced to 0.7 kg/person/day, and wet solid waste hauled out reduced to 0.7 kg/person/day.

SUMMARY OF THE INVENTION

Briefly summarized, disclosed herein is a combined heat, power, water and waste system.

Disclosed herein is the integrated water, waste and energy system for relocatable camps and remote communities whereby significant reductions of hauled potable water, liquid wastewater, solid waste and diesel are achieved over current art. A waste heat recovery system is employed to combine all sectors of the camp for maximum energy efficiency.

According to an aspect of some embodiments of the present invention, the integrated water, waste and energy system includes at least one heat pump, a thermal reservoir, and a heat management system. The at least one heat pump comprises a compressor configured to process water mist from an evaporator and to provide the water mist to a condenser. The thermal reservoir is configured to contain water and is operatively connected to the condenser. The heat management system is configured to receive and process excess heat generated between the hot thermal reservoir and the condenser. The heat management system comprises: a plurality of sensors configured to measure water pressure, temperature and flow; at least one control valve configured to control movement of a thermal energy from thermal sources; at least one thermal sink; a thermal storage; a plurality of heat exchangers fluidly connected to the thermal sources, to the at least one thermal sinks, to the thermal reservoir and to a plurality of pumps configured to circulate a heat exchange fluid between the thermal sources, thermal reservoir and the at least one thermal sink.

The integrated utility system, according to the exemplary embodiments, can provide at least a 33% reduction in the amount of diesel fuel delivered, at least a 33% reduction in hauled potable water, and at least a 33% reduction of hauled out liquid and solid waste without changing per capita consumption or generation amounts and behavior of personnel. It is desired that diesel fuel hauled in be reduced to 1650 L/person/year, potable water hauled in reduced to 100 L/person/day, blackwater hauled out reduced to 60 L/person/day, greywater hauled out reduced to 32 L/person/day, dry solid waste hauled out reduced to 0.7 kg/person/day, and wet solid waste hauled out reduced to 0.7 kg/person/day.

These and other features of the concepts provided herein will become more apparent to those of skill in the art in view of the accompanying drawings and following description, which describe particular embodiments of such concepts in greater detail.

BRIEF DESCRIPTION OF DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings in which:

FIG. 1 is a schematic view of a conventional reverse osmosis (RO) based treatment train for direct potable reuse (DPR) of secondary or tertiary treated wastewater;

FIG. 2 is a schematic view of a conventional non-RO based treatment train for DPR of secondary or tertiary treated wastewater;

FIG. 3 is a schematic view of an exemplary humidification-dehumidification (HDH) system according to the present invention;

FIG. 4 is a schematic view of an exemplary HDH system with an improved series-parallel heat pump configuration according to the present invention;

FIG. 5 is a schematic view of a DPR treatment train from secondary or tertiary treated wastewater that includes brine concentration via an HDH system and process heat integration from multiple systems according to the present invention;

FIG. 6 is a schematic view of a wastewater reuse treatment train from secondary or tertiary treated wastewater that includes process heat integration from multiple systems according to the present invention;

FIG. 7 is a schematic view of a DPR treatment train with separated blackwater and greywater that includes brine concentration via an HDH system and process heat integration from multiple systems according to the present invention;

FIG. 8 is a schematic view of a greywater reuse treatment train with separated blackwater and greywater that includes process heat integration from multiple systems according to the present invention;

FIG. 9 is a schematic view of a water treatment train that includes process heat integration from multiple systems according to the present invention;

FIG. 10 is a schematic view of a water treatment train that includes desalination via an RO system, brine concentration via an HDH system and process heat integration from multiple systems according to the present invention;

FIG. 11 is a schematic view of an ozone and biological filtration system with process heat integration before ozonation according to the present invention;

FIG. 12 is a schematic view of an ozone and biological filtration system with process heat integration after ozonation according to the present invention;

FIG. 13 is a schematic view of a RO system with process heat integration before the membrane according to the present invention.

DETAILED DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

For clarity, it is to be understood that the word "distal" refers to a direction relatively closer to any device to be used as described herein, while the word "proximal" refers to a direction relatively further from the device. Also, the words "including," "has," and "having," as used herein, including the claims, shall have the same meaning as the word "comprising."

Lastly, in the following description, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, components, functions, steps or acts are in some way inherently mutually exclusive.

The following terms are used in this specification and have the following meanings as understood within the context of those skilled in the art:

"AC": alternating current;
"AOC": assimilable organic carbon;
"AOP": advanced oxidation process;
"BAC": biological activated carbon;

"BDOC": biodegradable organic carbon;
"BOD": biochemical oxygen demand;
"CCP": critical control point;
"COD": chemical oxygen demand;
"COP": a coefficient of performance when related to the thermodynamic performance of heat pumps, or a critical operating point for a process;
"CT": concentration multiplied by time as mg-min/L;
"DBP": disinfection by-product;
"DC": direct current;
"DEWH": diesel exhaust waste heat;
"DOC": dissolved organic carbon;
"DPR": direct potable reuse;
"EBCT": empty bed contact time;
"EC": electrical conductivity;
"EPA": United States Environmental Protection Agency;
"ESB": engineered storage buffer;
"GAC": granular activated carbon;
"GUDI": groundwater under direct influence of surface water;
"HACCP": hazard analysis and critical control point;
"HDH": humidification-dehumidification;
"IPR": indirect potable reuse;
"LRV": log reduction value;
"MABR": membrane aerated biofilm reactor;
"MAC": maximum allowable concentration;
"MBR": membrane bioreactor;
"MF": microfiltration;
"MLD": minimum liquid discharge;
"NDMA": n-Nitrosodimethylamine;
"NF": nanofiltration;
"NTU": nephelometric turbidity units;
"PDT": pressure decay test;
"PV": photovoltaic;
"PV-T": photovoltaic-thermal;
"RO": reverse osmosis;
"RR": recovery ratio;
"SOC": synthetic organic compound;
"TDS": total dissolved solids;
"TSS": total suspended solids;
"TOC": total organic carbon;
"UF": ultrafiltration;
"UV": ultraviolet light;
"UVT": ultraviolet light transmittance; and
"ZLD": zero liquid discharge.

Unless defined otherwise, all technical and scientific terms used herein have the same meaning as commonly understood by those of ordinary skill in the art.

Embodiments disclosed herein are directed to the integrated water, waste and energy system for relocatable camps and remote communities whereby significant reductions of hauled potable water, liquid wastewater, solid waste and diesel are achieved over current art. A waste heat recovery system is employed to combine all sectors of the camp for maximum energy efficiency.

According to the exemplary embodiments, a system for providing the integrated camp with energy is provided. A microgrid power system is used to integrate complex power systems together such as diesel generators, renewable power, fuel cells, other power generation sources, and prioritize certain sources such as renewable power to meet the power demands on the microgrid. Batteries are used for storage, while the power itself is generated via diesel powered generators, and optionally renewable energy sources. Heat exchange devices are used to capture the energy from the diesel exhaust and are transferred to the waste heat recovery system.

Solids must be sorted via collection bins into metals, plastics, recyclable waste, and feedstock for gasification. Failure to separate will lead to excess emissions. The feedstock is dehydrated and shredded to prepare for conversion to syngas. The syngas can be combusted for use in the waste heat recovery system. Other potential iterations can utilize pyrolysis or straight combustion of the feedstock to provide energy to the waste heat recovery system.

A multi-barrier system to provide potable water from a raw water supply, in the non-limited exemplary embodiment of this invention consisting of biological filtration (ozone and biologically activated carbon), ultrafiltration (UF) or nanofiltration (NF), and ultraviolet (UV) disinfection. Optionally, treatment of greywater and blackwater from toilets, urinals, ablutions, laundry, kitchens and other sources with an advanced water treatment (AWT) process in the non-limited exemplary embodiment consisting of primary screening, fats-oils-greases (FOGs) separation, sedimentation, biological filtration (ozone and biologically activated carbon), UF or NF, and UV disinfection prior to introduction to an engineered storage buffer (a water tank) that mixes with the aforementioned raw water supply prior to the multi-barrier system above. The treated water being tested for fitness-for-purpose of reuse for applications such as dust-control, laundry or shower water. Further treatment of water after the multi-barrier system, considered to be a pretreatment system, whereby the combined partially treated raw water and blackwater/greywater is further treated to a potable water quality via a direct potable reuse train consisting of reverse osmosis (RO), advanced oxidation process (AOP), optional stabilization and remineralization system, and disinfected with sodium hypochlorite or other residual disinfectant. Treatment of brine reject by the abovementioned RO to minimum liquid discharge (MLD) or zero liquid discharge (ZLD) level by a brine concentration process such as humidification-dehumidification process (HDH) to increase the water recovery of the system, with the distilled water produced being mixed with the RO permeate prior to the AOP process. The aforementioned HDH system, being an improvement of U.S. Pat. No. 10,829,389 issued to Shahsavar et al. (2020), allows for the recovery of excess waste heat from the brine concentration process, which can be passed to the waste heat recovery system.

The primary source of waste heat in the system is that recovered from the improved HDH process. Excess waste heat is not an obvious or disclosed side effect of the HDH process due to the requirement of more heat than cooling energy. Typical brine concentration processes do not have the means to use the low-grade waste heat associated with the process. The improvements made upon U.S. Pat. No. 10,829,389 allow the excess process heat to be captured and used in other camp processes. In particular, the series-parallel configuration is non-obvious as the minimum amount of heat is upgraded via the heat pump to a high enough temperature to heat the brine to evaporate, while the second heat pump only has to operate to chill the condensing water to the chilled water temperature required to maintain a process heat balance. This is where the excess heat from that process instead of being rejected is extracted.

The waste heat recovery system uses a heat exchange fluid, such as water and propylene glycol, to transfer the excess low grade waste heat from the HDH, as well as the waste heat from diesel exhaust and the solid waste handling system, throughout the camp. The heated heat exchange fluid can be used to preheat tanks, tents, as freeze prevention, and in process improvements. The ideal use is to preheat the water for the biologically active carbon process to increase the development of the biofilm for treating contaminants, and to preheat the water entering the RO process. Preheating the RO inlet water reduces the need for larger amounts of membranes in cold weather operations and increases permeate flux.

Blackwater from toilets and urinals is treated via primary and secondary wastewater treatment technology according to the guidelines for reuse in toilets and urinals. In the exemplary configuration where greywater is not treated to reuse or discharged to the environment, optionally a blackwater and greywater treatment system receiving untreated blackwater and greywater from, but not limited to, toilets, urinals, ablutions, kitchens, laundry and other sources of wastewater, and treating it to reclaimed levels to reuse in toilets and urinals. Optionally further treating to the requirements for discharge into the environment such as the Canadian Wastewater Systems Effluent Regulations. The solids from the primary and secondary treatment technologies can be collected and dewatered for use as feedstock in the solid waste handling system.

To achieve reductions over prior art of at least 33% for hauled in diesel fuel and potable water, and hauled out solid and liquid waste, an integrated energy, water and waste utility system should be optimized at an overall system level rather than optimized at a subsystem level. For example, outputs from one system such as waste heat generated from the solid waste management system can be beneficially used in other systems such as providing thermal energy to preheat water in the water treatment system. An exemplary integrated energy, water and waste utility system, according to the present invention, consists of an energy system, liquid waste management system, solid waste management system, heat management system, and water treatment system.

The exemplary energy system may further consist of a hybrid diesel microgrid, which integrates diesel generators and/or fuel cells, renewable power sources such as wind, solar, hydroelectric and others, batteries, AC inverters, DC charge controllers, heat exchanger(s) to capture diesel exhaust waste heat (DEWH), and a microgrid controller. This microgrid may optionally have a connection to the electrical grid. Batteries may prioritize and store energy from renewable power sources, and/or be used to optimize loading of the generators to run at their highest fuel efficiency point to offset diesel fuel usage. In the operation of the exemplary microgrid, the microgrid controller monitors source availability and batteries to prioritize generation via renewable energy over diesel generation, limiting fuel consumption. Sources of power are feed to the batteries, bypassing it when fully charged to the AC power bus. Therefore, loads can be efficiently powered from sources such as photovoltaic (PV) during daylight hours. Excess generation from PV during the day not used to meet power load is used to charge batteries for nighttime use. When battery charge drops to a threshold such as 25%, diesel generators are staged to provide required power to meet demand and charge the batteries. This allows for diesel generators to run at peak efficiency, limiting operational hours, fuel, and maintenance. If peak demand cannot be met by renewable sources or from batteries, the microgrid stages generators to provide full capacity needed. Energy demand and usage is monitored and sent to the central monitoring system to allow for load optimization. Thermal energy recovered from DEWH collected by a heat exchanger can be transferred and stored in a heat management system in a thermal reservoir (tank) containing water, a propylene glycol and water mixture and/or a phase change material acting as a thermal battery. This thermal energy can be beneficially used to provide heat in tents, shelters, and buildings, further reducing diesel fuel used in space heaters. Furthermore, thermal energy may also be used beneficially in the water treatment system discussed herein.

The exemplary solid waste management system further consists of a dehydrator for wet solid waste, a shredder for dry solid waste, an optional dewatering system such as a centrifuge for biosolids generated from the liquid waste management system, and a waste-to-energy gasification boiler. As an alternative to a waste-to-energy gasification process, a pyrolysis process or incineration process may be employed, however operational complexity of pyrolysis systems should be considered, and air emissions limits need to controlled for both pyrolysis and incineration systems. Both wet solid waste and dry solid waste are stream separated into components that are compatible with gasification (compatible waste streams) so as to not exceed air emissions limits. Recyclable components such as metals and plastics should be separated from organic derived waste streams such as kitchen food waste or paper products in order to produce this compatible waste stream.

Optionally, biosolids from the liquid waste management system are dewatered and combined with compatible wet solid waste prior to dehydration. Compatible wet solid waste that is initially at 70% water content is dehydrated via the dehydrator prior to introduction to the gasification boiler. Compatible dry solid waste is shredded to reduce the volume of waste, and optionally combined with the dehydrated wet solid waste in a briquette machine to produce a feedstock for the gasification boiler or feed directly to a feed bin via a conveyor for introduction to the gasification boiler. After these streams are introduced to the gasification boiler, they are gasified at high temperature typically above 700° C. to produce a syngas that is primarily $H_2$ and CO. This syngas is then combusted to provide a clean source of high-grade process heat. For a sufficiently large system with sufficient solid waste feed source, it may be economically viable to generate electricity using this high-grade process heat, whereby remaining waste-heat may be captured by the heat management system and electricity stored in batteries or used directly in the microgrid. For smaller systems, this high-grade thermal energy produced by combustion of the syngas can be captured by the heat management system and used beneficially in the water treatment system or to provide heat in tents, shelters, and buildings, further reducing diesel fuel used in space heaters. A small amount of slag and ash is generated from the feedstock that is gasified in the gasification boiler system. This slag and ash as well as non-compatible waste streams not gasified may be hauled away to a landfill or may be recycled. Alternatively, the slag and ash, originally primarily derived from biomass material, may optionally be land spread where allowed. As a result of this solid waste management system, a significant reduction in the total mass of the original wet and dry solid waste can be achieved.

The exemplary liquid waste management system consists of separated greywater and blackwater waste streams, whereby a blackwater treatment process manages blackwater generated from toilets and urinals and is treated to the standard required for reuse back into toilets according to the health guidelines. Biosolids produced by the blackwater treatment process are gravity-thickened and may be optionally dewatered and introduced with compatible wet solid waste prior to the dehydrator in the solid waste management system. Greywater separately is managed by the water treatment system. By treating blackwater and reusing this reclaimed water within toilet and urinals, the total volume of blackwater to be hauled away is significantly reduced.

Additionally, non-potable water originally hauled in for flushing toilets and urinals is reduced. An alternative exemplary liquid waste management system consists of primary and secondary wastewater treatment of combined greywater and blackwater streams. Biosolids produced by the primary and secondary wastewater treatment process are gravity-thickened and may be optionally dewatered and introduced with compatible wet solid waste prior to the dehydrator in the solid waste management system. Treated effluent may be further treated to meet the standard for reuse in toilets and urinals to offset non-potable water usage according to the health guidelines, discharged to the environment if effluent quality meets or exceeds the requirements of the wastewater regulations, or introduced to the water treatment system for reuse and recycling, in order to significantly reduce the total volumes of greywater and blackwater to be hauled away.

The exemplary heat management system consists of a control system with various sensors to measure pressure, temperature and flow, and control valves to control the movement of thermal energy from thermal sources, thermal sinks, and thermal storage, heat exchanger(s) fluidly connected to thermal sources of thermal energy, heat exchangers fluidly connected to thermal sinks for thermal energy, one or more thermal reservoir (tank) containing water, a propylene glycol and water mixture and/or a phase change material acting as a thermal battery for thermal storage, pumps to circulate a heat exchange fluid such as water or a mixture of propylene glycol and water between thermal source(s), the thermal reservoir, and thermal sink(s). Optionally, one or more radiators may be used to radiate excess thermal energy to the environment.

Optionally, excess thermal energy may be used in adsorption chillers and/or absorption chillers in order to provide air conditioning or meet other cooling requirements. Thermal sources of thermal energy include DEWH, heat from gasification within the solid waste management system, and excess process heat from humidification-dehumidification brine concentration in the water treatment system. Thermal sinks for thermal energy include freeze prevention of pipes and tanks, space heating for tents, shelters, and buildings, preheating input water to subsystems in the water treatment system such as domestic hot water, ozonation, biological filtration and/or membrane-based processes such as reverse osmosis (RO), and process heat for adsorption chillers and/or absorption chillers.

Despite recent advances in developing regulatory frameworks for direct potable reuse (DPR) to treat wastewater to drinking water by the US EPA, State of California, State of Florida, State of Texas and other jurisdictions, an overarching consistent standard for the required log reduction values (LRVs) of *Cryptosporidium, Giardia* and viruses or the required technical processes, barriers and management control processes have not been fully established. The Texas Commission on Environmental Quality has previously approved 2 DPR projects on a case-by-case basis that required LRVs of 8/5.5/6 for enteric virus, *Cryptosporidium*, and Giardia respectively following wastewater treatment. As discussed in the US EPA's 2017 *Potable Reuse Compendium* (US EPA, 2017), the LRV requirements at the Wichita Falls, Tex. DPR project were increased by the Texas Commission on Environmental Quality to 9-log removal of viruses and 8-log removal of Giardia following monitoring of treated wastewater effluent showing maximum concentrations could be present than previous observations. The State of California has recently drafted regulations proposing LRVs of 16/11/10 for enteric virus, *Cryptosporidium*, and Giardia respectively between raw wastewater and finished drinking water, with the requirement for extra log reduction capacity by designing treatment trains to achieve LRVs of 20/15/14 for enteric virus, *Cryptosporidium*, and Giardia respectively. Source control of chemicals that may enter wastewater such as 1,4-dioxane that are difficult to treat or can impair the final treated water quality have been proposed as requirements for DPR systems. Moreover, the Hazard Analysis and Critical Control Point (HACCP) methodology has been proposed for DPR systems by Tchobanoglous et al. in *Framework for Direct Potable Reuse* (WateReuse Research Foundation, Project Number 14-20, 2015) and recommended for adoption into regulatory frameworks to manage microbiological and chemical contaminants in water treatment systems. Asteberg et al. discussed in *Mörbylånga DWTP, Sweden: Direct Potable Reuse in Combination With Brackish Water Desalination* (International Desalination Association World Congress, 2019) a recently commissioned system that combined brackish seawater and groundwater with used process water from a local food processing plant to create a DPR system that was intended to be fail-safe, loosely coupled, redundant and provided 6 to 7 microbial barriers to achieve a theoretical log removal of 16.8 for adenovirus. At each microbial barrier, at least two independent online monitoring systems are implemented to provide critical control points (CCPs). Treated wastewater however does not necessarily need to meet any of these exemplary DPR standards for all applications. In the US Army Public Health Center's *Review of the Applicability of Published Water Reuse Guidelines for Contingency Operations* (US Army Public Health Center PHIP No. 39-06-0417, 2017) the concept of use cases for reuse of greywater to provide standards for reuse water quality dependent on the application is discussed. These standards for a given application provide a fitness-for-purpose for the treated greywater that would enable soldiers in the field to reuse water in contingency scenarios where water availability is limited. It is discussed that not all use cases require potable water, and that reusing treated greywater represents a potential significant reduction in logistical burdens in provisioning water and managing disposal of wastewater. *Water Reuse in Contingency Operations* (US Army Public Health Center Technical Guide 364a, 2014) further discusses specific treatment trains and proposed water quality requirements that may enable unrestricted reuse and restricted reuse of treated wastewater for different use cases such as shower water reuse.

In one embodiment of the exemplary water treatment system, a multiple barrier, loosely coupled redundant system consists of multiple subsystems to treat secondary, or tertiary treated combined blackwater and greywater effluent from the exemplary liquid waste management system to a potentially restricted reuse water quality specification, a potentially non-restricted reuse water quality specification, and/or a full direct potable reuse specification. In another embodiment of the exemplary water treatment system, a multiple barrier, loosely coupled, redundant system consists of multiple subsystems to treat greywater effluent that bypasses the exemplary liquid waste management system (wherein blackwater is separately treated for reuse in toilets and urinals in the foregoing) to a potentially restricted reuse water quality specification, a potentially non-restricted reuse water quality specification, and/or a full direct potable reuse specification. In yet another embodiment of the exemplary water treatment system, a non-potable water source such as surface, groundwater, or groundwater under direct influence (GUDI) is treated to a non-potable or potable specification rather than greywater or a secondary or tertiary treated wastewater source. In any of the foregoing embodiments of the exemplary water treatment system, process heat from the exemplary heat management system is used to preheat water, or alternatively precool water via an adsorption and/or absorption chiller driven by process heat, providing temperature control to improve performance, and a design boundary of the lower and upper temperature limits of operation to particular subsystems such as, but not limited to, ozonation, biofiltration, and membrane-based processes. These advantages are further discussed in the following detailed description of FIG. 11, FIG. 12, and FIG. 13. In a particular embodiment, loose coupling and redundancy is partially achieved using engineered storage buffers (ESBs), typically implemented as tanks with a hydraulic retention time of 8 to 24 hours or longer, that provide operators with additional failure response time to address process upsets or failures. In some embodiments, reverse osmosis (RO) brine concentrate is further volumetrically reduced to minimum liquid discharge (MLD) or zero liquid discharge (ZLD) by a low temperature thermal process such as humidification-dehumidification (HDH). The foregoing HDH process being an improvement upon U.S. Pat. No. 10,829,389 by Shahsavar et al. that may provide excess process heat to the exemplary heat management system as discussed further in following detailed description of FIG. 3 and FIG. 4. As a result of any of the foregoing embodiments, hauled in potable water volumes may be significantly reduced. As well, hauled out blackwater and/or greywater volumes may be significantly reduced in any particular embodiments that enables the reuse and recycling of blackwater and/or greywater.

Referring now to the accompanying drawings, prior art and exemplary embodiments of the present invention are illustrated.

Referring now in detail to FIG. 1, a simplified schematic of prior art reverse osmosis (RO) based treatment train for direct potable reuse (DPR) illustrates a process by which secondary or tertiary effluent from wastewater treatment 1-1 can be treated with a multi-barrier system to a drinking water standard or supplied to a drinking water treatment plant 1-10. This RO based system combines elements presented by Tchobanoglous et al. in *Framework for Direct Potable Reuse* (WateReuse Research Foundation, Project Number 14-20, 2015) such as the use of engineered storage buffers 1-9 and work presented by Walker et al. in *Development of an Operation and Maintenance Plan and Training and Certification for Direct Potable Reuse* (DPR) Systems (Water Research Foundation, 2016). Chloramine 1-2 provides residual disinfection to reduce the risk of biofouling. Chloramine is selected because RO membranes otherwise will oxidize when exposed to free available chlorine. The downside of using chloramine as a disinfectant is the generation of disinfection by-products (DBPs) such as nitrosamines. Depending on how ammonia and chlorine are introduced at this stage, there is a potential risk to increase NDMA, a DBP classified as a probable carcinogen and regulated to a maximum allowable concentration (MAC) of 0.00004 mg/L in the *Guidelines for Canadian Drinking Water Quality* (Health Canada, 2020). Following this step, microfiltration (MF) or ultrafiltration (UF) 1-3 provide a high-quality filtrate for RO. This step can provide significant log reduction values (LRVs) of microorganisms such as Giardia, *Cryptosporidium*, bacteria, and viruses, especially when combined with a pressure decay test (PDT) for validation. The filtrate of MF or UF 1-3 then passes to RO 1-4 whereby dissolved ions and organics are further removed. The concentrated byproduct of this is the reverse osmosis brine concentrate 1-5, which must be disposed of appropriately. Electrical conductivity (EC) or total organic carbon (TOC) measurements are typical surrogates used as critical control points (CCPs) for RO. Achieving high LRVs with RO can be difficult due to the resolution limit of EC and TOC instruments. The addition of antiscalant chemicals or pH correction with acid or caustic dosing can increase the recovery ratio (RR) possible in RO 1-4, minimizing the amount of brine concentrate 1-5 to disposal. The low salinity permeate from RO then passes to an advanced oxidation process (AOP) 1-6 such as $UV/H_2O_2$ or $UV/O_3$. The purpose of the AOP 1-6 is to generate hydroxyl radicals (.OH) that very rapidly react with trace organic compounds that passed through RO such as NDMA, pharmaceuticals and synthetic organic compounds (SOCs). With adequate dosing, AOP 1-6 can achieve mineralization of these trace organic compounds, significantly reducing dissolved organic carbon (DOC) levels with the potential to have very high LRVs of pathogens (depending on the jurisdiction). The next step is to stabilize the low salinity permeate by restoring or balancing hardness, alkalinity, and pH. Stabilization 1-7 can be accomplished in many ways such as dosing calcium hydroxide (lime), calcium carbonate (calcite), CO2, and/or mineral acids such as sulfuric or hydrochloric acid into the permeate. This process prevents downstream corrosion within the plant, distribution network and at the point of use. Next is chlorination 1-8, which provides a residual disinfectant as mandated by various regulatory bodies for downstream distribution. This process is also necessary to achieve additional LRVs for Giardia and viruses. For instance, the EPA provides up to 3-log credit for Giardia and 4-log for viruses if systems are designed with appropriate contact time (CT). Following this, an engineered storage buffer (ESB) 1-9 is used to retain the treated water following 1-8 for a sufficient time to provide an opportunity for operators to monitor performance of systems and measure key parameters. This ESB 1-9 reduces the need for redundant treatment systems and online monitoring by providing a buffer before treated water enters the downstream drinking water treatment plant or distribution network 1-10. The sizing of the ESB 1-9 should be sufficient that the failure response time of an operator is much less than the residence time of treated water in the tank or buffer. In indirect potable reuse (IPR) processes, ESBs are substituted with large environmental buffers such as reservoirs or aquifers.

Referring to FIG. 2, a simplified schematic of prior art non-RO based treatment train for direct potable reuse (DPR) illustrates a process by which secondary or tertiary effluent from wastewater treatment 2-1 can be treated with a multi-barrier system to a drinking water standard or supplied to a drinking water treatment plant 2-10. This process is also based upon work by Tchobanoglous et al. (2015) and Walker et al. (2016) that illustrates a potential process that is likely to cost less than an RO based DPR treatment train, while also not having to address issues with RO brine concentrate 1-5. Ozone ($O_3$) 2-2 is first introduced to the secondary or tertiary treated wastewater effluent 2-1 to pre-oxidize compounds prior to biofiltration downstream. Ozone is a strong oxidant and disinfectant with the EPA granting up to 3 log inactivation for Giardia and *Cryptosporidium* and up to 4 log inactivation for viruses. A downstream biofiltration process such as biologically active carbon (BAC) 2-5 is needed due to the oxidation of organic matter by $O_3$ into assimilable organic carbon (AOC), which otherwise causes bacterial regrowth in downstream distribution networks. To achieve high LRVs, a properly designed contact chamber must be designed to provide adequate mass transfer of $O_3$ gas) into water and CT. Due to the low solubility of ozone in water and mass transfer efficiency of contact chambers, a portion of the off-gas from this step may have to undergo ozone destruction to achieve air quality requirements. The next step is coagulation, flocculation, and sedimentation 2-3. A coagulant such as ferric chloride ($FeCl_3$) is used to neutralize charge on suspended solids and destabilize them to cause them to agglomerate. A flocculation and sedimentation tank that provides gentle mixing enables the formation of larger flocs of microorganisms and suspended/dissolved organics/inorganic matter that will settle faster due to Stokes' law. So long as the dose of coagulant is optimized and this settling time is less than the empty bed contact time (EBCT) of the tank, the supernatant should have reduced turbidity which will extend the operational time between backwashes of the downstream BAC filter 2-5. After sedimentation and removal of suspended solids and some organic matter, further ozone treatment at 2-4 is introduced to further convert dissolved organic carbon (DOC) into biodegradable organic carbon (BDOC) and AOC. The BAC filter 2-5 works synergistically with upstream ozonation 2-2, 2-4 to remove AOC, turbidity, suspended solids, organic matter, and inorganics such as iron and manganese. The media promotes the growth of biomass that consumes organic matter while simultaneously acting as a filter bed. In conjunction with upstream coagulation 2-3, the EPA provides LRVs of 2.5-log for Giardia and 2-log for viruses and *Cryptosporidium* for properly designed and operated systems. The EBCT of the BAC filter 2-5 is typically 10 to 20 minutes according to Brown et al. in the *Biofiltration Guidance Manual for Drinking Water Facilities* (Water Research Foundation Project No. 4719, 2020) to provide adequate time for adsorption or biodegradation of organics. It is also critical that the ozone dose be monitored so adequate DOC is broken down into BDOC and AOC prior to the BAC filter 2-5 to achieve removal. The next step to process the filtrate from the BAC filter 2-5 is the inclusion of a granular activated carbon (GAC) filter 2-6. Residual organic compounds not removed by the BAC filter 2-5 are polished by the GAC filter 2-6, including but not limited to micropollutants such as personal care products, pharmaceuticals, endocrine disrupting chemicals and PFAS. The required EBCT may need to be determined by pilot testing of various types of activated carbon to show effective removal of these micropollutants. Following GAC adsorption 2-6 the filtrate enters the UV disinfection process 2-7. UV light in the germicidal range, primarily at 254 nm (for low pressure Hg lamps) or 265 nm (for UV-C LEDs), is absorbed by RNA and DNA. This interrupts the ability of pathogens to reproduce. The EPA provides LRVs up to 4-log for *Cryptosporidium, Giardia*, and viruses for properly designed and operated UV systems. For UV disinfection to be effective, a high UV transmittance (UVT) is required, thus necessitating upstream treatment and filtration of turbidity, organics and suspended solids. To achieve 4-log reduction of viruses, a significantly higher UV dose is needed at 186 $mJ/cm^2$ versus 22 $mJ/cm^2$ for Giardia and *Cryptosporidium*. Following UV disinfection 2-7, chlorination 2-8 is performed as discussed above in chlorination for RO based processes 1-8. Similarly, this chlorinated treated water is retained in an ESB 2-9 for the same reasons that the ESB 1-9 is employed.

In FIG. 3, a simplified schematic of an exemplary humidification-dehumidification (HDH) process with improvements on previous work by one of the authors in U.S. Pat. No. 10,829,389 issued to Shahsavar et al. (2020) according to the present invention is illustrated. Reverse osmosis brine concentrate 3-1 is introduced to a brine tank 3-2. Brine is circulated with a pump 3-3 through the cold heat exchanger (CHX) 3-4 which acts to recuperate heat captured by condensation in the dehumidifier/condenser 3-8. This preheated brine then enters the hot heat exchanger (HHX) 3-5 to achieve a desired top brine temperature prior to introduction to the humidifier/evaporator 3-6 acting direct heat and mass exchanger. A portion of the heated brine evaporates into the circulated air stream due to psychrometric effects, with the concentrated brine returning to the brine tank 3-2. The hot, humid air created is close to 100% relative humidity and has a temperature that approaches the top brine temperature. This hot, humid air exits the humidifier 3-6 and is circulated by a fan 3-7 before entering a dehumidifier/condenser 3-8. In the dehumidifier 3-8 which is acting as a direct heat and mass exchanger, the hot and humid air is cooled and condensed by cooling water consisting of chilled distilled water. The cold air stream exits the dehumidifier at a relative humidity close to 100% and an air temperature approaching the bottom cooling water temperature, where it is circulated back to the humidifier 3-6. Condensed water formed in the dehumidifier 3-8 combines with cooling water into the distilled water tank 3-9. The heat released from this condensation process causes a temperature increase in the cooling water, and therefore the subsequent combined stream in the distilled water tank 3-9. Some or all this generated condensed water can be discharged from the distilled water tank 3-9 as distilled water out 3-14. Some or all the distilled water is then pumped 3-10 through the CHX 3-4. If the temperature of the brine entering the CHX 3-4 is greater than that of the distilled water, the distilled water can bypass the heat exchanger via 3-11. Otherwise, the heat captured from condensation is recuperated to the incoming brine stream to preheat it in the CHX 3-4. Some or all the distilled water can then be discharged out of the system via 3-13. Some or all the distilled water proceeds to the intermediate heat exchanger (IHX) 3-12 where it is chilled to the bottom cooling water temperature to become chilled distilled water before entering the dehumidifier 3-8 as cooling water. As brine is circulated through the evaporator 3-6, the salinity in the brine tank 3-2 will tend toward saturation. This process of evaporation and/or crystallization can be continuously cycled through to achieve the desired volumes of brine, whether minimum or zero liquid discharge of brine concentrate 3-15. Heating and cooling needed to drive this thermal process is generated primarily by a heat pump 3-26. This heat pump 3-26 consists of a compressor 3-28, condenser 3-27, expansion valve 3-31, and evaporator 3-30. External work 3-29 in the form of electrical energy is supplied to the compressor 3-28. This is necessary to satisfy the Second Law of Thermodynamics, whereby heat transfer from a cold reservoir to a hot reservoir requires external work to be performed on the system. A potential alternative to the heat pump 3-26 is a thermoelectric cooler such as a Peltier heat pump. The heat pump 3-26 has a refrigerant such as R-410*a* that circulates in a loop. In the condenser 3-27, heat is released by the refrigerant (Q_dot_2). After throttling refrigerant by an expansion valve 3-31 or a similar device, heat is absorbed by the refrigerant (Q_dot_1) in the evaporator 3-30. In larger heat pumps, an alternative to the expansion valve 3-31 consists of a turbine. The refrigerant is then compressed by a compressor 3-28, powered by external work (W_dot) 3-29, to increase its temperature and pressure before returning to the condenser 3-27. Assuming an idealized adiabatic heat pump, the heat released by the condenser 3-27 is equal to the external work 3-29 plus the heat absorbed the evaporator 3-30 (Q_dot_2=W_dot+Q_dot_1).

Equivalently, the heat released is equal to the external work 3-29 multiplied by the coefficient of performance (COP) of the heat pump 3-26 (Q_dot_2=COP*W_dot). Based upon experimental data collected from a bench scale HDH model, chilling requirements by IHX averaged 543 kWh per m$^3$ of distilled water produced (543 kWh/m$^3_{distilled\ out}$) with a standard deviation of 52.8 kWh/m$^3_{distilled\ out}$. Heating requirements by HHX averaged 399 kWh per m$^3$ of distilled water produced (399 kWh/m$^3_{distilled\ out}$) with a standard deviation of 127 kWh/m$^3_{distilled\ out}$. This experimental data illustrates how chilling requirements typically exceed heating, enabling the extraction of excess heat for other processes. Chilling requirements of IHX 3-12 dictates the requirements of the heat pump for Q_dot_1. Similarly, the heating requirements of HHX 3-5 dictate the requirements of the heat pump for Q_dot_2. Ideally, a heat pump could dynamically vary external work W_dot in order to provide the heat required to be released at Q_dot_2. For any two fixed temperatures of evaporation and condensation, there exists a theoretical Carnot Heat Pump coefficient of performance that limits the ability to simultaneously control Q_dot_2 and Q_dot_1 with a dynamic W_dot. Any practical heat pump will have a COP much lower than the theoretically maximum COP of a Carnot heat pump. As such one skilled in the art is able to provide the required cooling for the process but will have excess process heat as Q_dot_2 will typically be greater than the heating demands in the HHX 3-5. This excess heat must be removed from the process to maintain a heat balance. A radiator 3-21 may be implemented to remove excess heat to the environment. Alternatively, as an improvement over the prior art, this excess heat can be removed 3-20 and used to preheat upstream systems for beneficial purposes in biological and RO treatment trains. Conventional thermal brine concentration systems typically require an external form of heat to be added to them to drive the process such as low-pressure steam or high-grade waste heat at or above 90° C., however in this exemplary embodiment of the present invention, an HDH system thermally driven by an electrically powered heat pump is able to supply excess heat out from the hot side of the process to other processes as discussed in the foregoing. A cold thermal reservoir typically consisting of a tank containing water or a mixture of propylene glycol and water 3-22 is pumped 3-23 through the cold circulation loop. An optional freeze prevention heater 3-24 is added to provide heat to the cold circulation loop to assist with freeze prevention and system startup. The evaporator 3-30 then absorbs heat out of this cold circulation loop (Q_dot_1), to chill the fluid to below the bottom cooling water temperature. An optional IHX bypass 3-25 can be used if the cold circulation loop is hotter than the cooling water loop during process upsets or system startup. If not bypassed, the cold circulation loop passes through the IHX 3-12 in order to set the bottom cooling water temperature of the cooling water loop. On the hot circulation loop, starting at the hot thermal reservoir 3-16, water or a mixture of propylene glycol and water is pumped 3-17 through the heat pump condenser 3-27. The condenser 3-27 releases heat into the hot circulation loop (Q_dot_2), heating it to above the top brine temperature. An optional heater 3-18 enables independent temperature control from the cold circulation loop. An optional HHX bypass 3-19 allows the hot circulation loop to bypass the HHX when the loop is at a lower temperature than the brine side of the HHX during process upsets. If not bypassed, the hot circulation loop is used to heat the brine in the HHX 3-5 up to the top brine temperature. Excess process heat can be rejected to the external heat management system 3-20. Any remaining heat that must be rejected from the hot circulation loop to maintain a heat balance can be rejected to atmosphere via a radiator 3-21.

Referring now to FIG. 4, a simplified schematic of an exemplary humidification-dehumidification (HDH) process with improved series-parallel heat pump configuration according to the present invention is illustrated. FIG. 4 is a superset of FIG. 3, adding a second heat pump 4-28, a third circulation loop consisting of a second hot thermal reservoir 4-16 consisting of water or a mixture of water and propylene glycol, and with the first heat pump 4-34 controlled in a different manner than in 3-26. The first heat pump 4-34 is used to create a baseload of chilling in the cold circulation loop. The first heat pump 4-34 upgrades enough heat via external work 4-37 to meet the requirements of Q_dot_2 by rejecting this heat at 4-35 into the hot circulation loop. This heat is circulated through the HHX 4-5 to set the top brine temperature as discussed earlier with reference to FIG. 3. To satisfy the remaining chilling requirements, the second heat pump 4-28 is used to chill the cold circulation loop further via evaporator 4-32 to set the bottom cooling water temperature via IHX 4-12. The heat extracted from the evaporator 4-32 is upgraded with external work 4-31 in the second heat pump 4-28 and rejected to the third circulation loop at the condenser 4-29. Since the requirements for heating and cooling are satisfied at HHX 4-5 and IHX 4-12 respectively already, this heat absorbed into the third circulation loop is excess for the HDH process. It may be rejected from the process to the heat management system at 4-18 or rejected to the atmosphere by a radiator 4-19. A major benefit of this configuration is the ability to independently control the top brine temperature and bottom cooling water temperature via the two heat pumps. Due to the arrangement of evaporator 4-38 from the first heat pump 4-34 being the first in the series of evaporators, the compressor 4-36 must do less work to lift refrigerant to a pressure to hit the just above the top brine temperature at the compressor 4-35 used to drive heat into the HHX 4-5. Similarly having parallel condensers 4-35 and 4-29 to separate circulation loops similarly allows for the third circulation loop to operate at a lower temperature and therefore require less external work 4-31, making the process more energy efficient.

Turning now to FIG. 5, a simplified exemplary DPR system with brine concentration according to the present invention is illustrated to treat secondary or tertiary effluent 5-1 to a potable water specification for distribution or to a drinking water treatment plant 5-24. An Advanced Water Treatment system 5-2 is used to treat water for potential restricted reuse 5-10, following a test of fitness-for-purpose. Non-potable makeup water 5-8 such as from a source of groundwater, surface water or groundwater under direct influence (GUDI) is blended with the treated water from the Advanced Water Treatment system 5-2 in the engineered storage buffer (ESB) 5-9. Some or all this water is introduced to the pretreatment system 5-11.

This now further treated water 5-17 can potentially be reused in non-restricted applications such as for laundry, showers, or other hygienic purposes after a test of fitness-for-purpose. Some or all this water is introduced to the RO based treatment system 5-18. Brine concentrate 5-25 from RO 5-19 is further concentrated with a low temperature thermal process such as humidification-dehumidification (HDH) 5-26. Distilled water from HDH 5-26 is combined with permeate from RO 5-19 prior to the AOP process 5-20. A novel improvement over prior art is that total brine volumes can be minimized for minimum liquid discharge (MLD) or zero liquid discharge (ZLD) 5-27 out of the HDH system 5-26, overcoming brine concentrate disposal issues outlined previously in prior art FIG. 1 at reference numeral 1-5. An improvement over the prior art is the use of excess process heat 5-28 from the HDH system 5-26, which can be combined with other sources of excess heat in a heat management system 5-30. Other exemplary sources of excess heat potentially available include process heat from gasification 5-31 out of the solid waste management system 5-33 and diesel exhaust waste heat (DEWH) 5-32 from the hybrid diesel microgrid 5-34. The process heat to preheat input water 5-29 can be introduced to the Advanced Water Treatment process train 5-2, Pretreatment process train 5-11 and/or the RO process train 5-18.

This process heat 5-29 is used to provide temperature regulation, providing a source of heat to prevent freezing during winter or for cold weather operations. Furthermore, the input temperature to biological processes such as biofiltration 5-5, 5-13 can be controlled, significantly improving their performance. By regulating and providing a temperature floor, reduced water flux effects seen at lower temperatures through NF and RO membranes are mitigated. This results in less membrane surface area being required to accommodate operation in cold weather conditions. As temperature climbs, both water flux and salt passage typically increase in RO membranes, moreover RO membranes typically have temperature limitations based on materials of construction that limit the maximum operating temperature that should be allowed. Therefore, heat introduced by 5-29 must also be limited to provide for a ceiling on temperature. A control means is used to control the movement of thermal energy from thermal sources to thermal storage, and then to thermal sinks in order to provide temperature control. Conventional applications do not employ improvements to biofiltration processes used as pretreatment to RO or how overall process sizing can be decreased by providing a mechanism for temperature control into pretreatment and RO based treatment trains. Following the exemplary system of FIG. 5, the combination of these properly designed and operated systems 5-2, 5-11, 5-18, and 5-26 shall have achieved enough LRVs of *Giardia, Cryptosporidium*, and viruses to meet the requirements for direct potable reuse of wastewater back to drinking water at 5-24. ESBs with reference numerals 5-9, 5-16 and 5-23 are employed as discussed with reference numeral 1-9.

Referring now to individual subsystems, 5-3 shows an optional primary or secondary treatment process in the non-limiting embodiment consisting of some or all of primary settling, sedimentation, and clarification, activated sludge processes, aerobic processes, anaerobic processes, membrane bioreactors (MBR) and membrane aerated biofilm reactors (MABR). This process is necessary when the BOD and/or COD of the upstream secondary or tertiary effluent from wastewater treatment 5-1 is too high to be oxidized by downstream ozone 5-4. According to the exemplary embodiments, optional primary or secondary treatment 5-3 may reduce BOD and/or COD to enable ozonation at 5-4 to be introduced at a practical level. This ozone system 5-4 provides similar function to 2-2, 2-4, converting DOC into BDOC and AOC. A biological filter (implemented as BAC) 5-5 provides the same function as 2-5. Turning now to ultrafiltration (UF) 5-6, a high-quality filtrate is produced like 1-3. UV 5-7 provides the same function as 2-7. The use of UV rather than chlorination is to have some form of disinfection before storage in the ESB 5-9 while avoiding issues related to downstream oxidation of NF or RO membranes as discussed in the chloramine process 1-2. Some quantity of non-potable makeup water 5-8 can be introduced with the treated output of 5-2 at the ESB 5-9. Referring now to individual subsystems within 5-11, ozonation 5-12 performs the same function as 5-4, oxidizing the combined makeup water and advanced water treatment output prior to biofiltration via BAC 5-13. UF or NF 5-14 on this combined stream provides a high-quality filtrate downstream, with optional removal of some monovalent, divalent ions, biopolymers, and other low molecular weight compounds if NF is implemented.

UV 5-15 once again provides disinfection of the treated water prior to storage in an ESB 5-16. Referring now to RO 5-18, dissolved ions are removed as discussed with 1-5. AOP 5-20 treats permeate from RO 5-18 and distilled water from HDH 5-26 to mineralize trace organics as discussed in 1-6. Following this, stabilization 5-21, chlorination 5-22 and storage in ESB 5-23 prior to distribution mimic the function of 1-7, 1-8 and 1-9 respectively.

Referring now to FIG. 6, a simplified exemplary wastewater reuse system according to the present invention is illustrated to treat secondary or tertiary effluent 6-1 to potentially be reused in non-restricted applications such as for laundry, showers, or other hygienic purposes after a test of fitness-for-purpose at 6-17. FIG. 6 is a subset of FIG. 5, lacking the features of the RO Treatment train 5-18 and HDH brine concentrator 5-26.

In FIG. 7, a simplified exemplary DPR system with brine concentration according to the present invention is illustrated to treat greywater 7-1 to a potable water specification for distribution or to a drinking water treatment plant 7-24. FIG. 7 depicts most of the features of FIG. 5, but instead separates blackwater 7-37 from toilets and urinals, and greywater 7-1 from laundry, kitchens, ablutions. The purpose of this separation is to decrease the amount of contamination in the wastewater that is being reused and/or recycled, decrease the potential risk to public health in reusing and/or recycling wastewater, to eliminate perceived concerns of reuse and/or recycling blackwater, or to meet regulatory requirements where blackwater reuse and/or recycling is currently prohibited. Instead, in FIG. 7, blackwater 7-37 undergoes treatment 7-38 to meet the requirements 7-39 to enable reuse in toilets and urinals 7-36. Excess treated wastewater and backwash water not reused in blackwater treatment 7-38 is sent for discharge if the effluent quality meets discharge standards or is sent for further wastewater treatment. Makeup water for toilets and urinals 7-35 is introduced as needed to provide water for flushing.

Referring now to FIG. 8, a simplified exemplary wastewater reuse system according to the present invention is illustrated to treat greywater 8-1 to potentially be reused in non-restricted applications such as for laundry, showers, or other hygienic purposes after a test of fitness-for-purpose at 8-17. FIG. 8 is a subset of FIG. 7, lacking the features of the RO train 7-18 and HDH brine concentrator 7-26.

In FIG. 9, a simplified exemplary water treatment system with heat integration 9-9 according to the present invention is illustrated to treat non-potable water 9-1 from surface, groundwater or GUDI sources to a treated water specification 9-8. FIG. 9 is a subset of FIG. 5, lacking features such as the Advanced Water Treatment train 5-2, RO train 5-18, HDH 5-26, and treats non-potable water 9-1 rather than secondary or tertiary effluent from wastewater treatment 5-1.

Referring now to FIG. 10, a simplified exemplary water treatment system with desalination and heat integration 10-20 according to the present invention is illustrated to treat non-potable water 10-1 from surface, groundwater or GUDI sources to a potable water specification for distribution or to a drinking water treatment plant 10-15. FIG. 10 is a superset of FIG. 9 that includes an RO train 10-9 and HDH 10-17.

FIG. 11 shows an exemplary pre-heating arrangement prior to ozonation and biological filtration according to the present invention. Input water to the system 11-1 is pumped 11-2 to a minimum operating pressure, typically greater than 275.8 kPa (40 psi) before being heated via process heat from the heat management system 11-4 in a heat exchanger 11-3. Ozone is generated by an ozone generator 11-5 and injected into the water stream via a venturi 11-6. A portion of water can be bypassed through a flow control valve 11-7 to control the amount of ozone added to the water.

This ozone, air, water mixture is mixed in a static mixer 11-8 prior to introduction to ozone plug flow reactor 11-9 acting as a contactor to meet CT requirements. Following the contractor 11-9, water passes through a biological filter (implemented with BAC) 11-10. It is known that biofiltration is more effective when water temperature exceeds 15° C., with reaction kinetics doubling every 10° C. Significant increases of biofilm formation observed when temperature is greater than 15° C., and conversely a decline in biofilm formation when temperature is below 5° C. Therefore, control over the temperature of the water in ozonation and biofiltration processes is critical to manage the performance of those systems.

Referring now to FIG. 12, an exemplary heating arrangement following ozonation and before biological filtration is presented. This arrangement follows closely to the implementation of FIG. 11, however the heat exchanger 12-8 is positioned after the ozone plug flow reactor 12-7. This arrangement allows for the temperature to be increased following ozone injection and contact, enabling high solubilities of ozone in water to be achieved. Temperature entering the biological filter 12-10 can be controlled to improve biofiltration effectiveness as discussed above. A hybrid combination of FIG. 11 and FIG. 12 can be constructed to control the temperature of the water prior to ozonation and biofiltration separately.

Finally in reference to FIG. 13, an exemplary preheating arrangement for NF or RO according to the present invention is shown. Input water 13-1 that is pumped into the system is heated via process heat 13-2 in a heat exchanger 13-3 prior to the pressure pump 13-4. For a person skilled in the art to design a NF or RO treatment train to operate in cold and warm climate conditions without temperature control, significantly more membrane surface area is required. In addition, it is not recommended to continuously operate above 40° C. due to materials of construction, necessitating an upper bound to the temperature of operation for most kinds of NF and RO membranes.

Thus, an improvement over prior art to improve the operation of NF and/or RO based treatment trains is to introduce process heat 13-2 upstream of a NF or RO membrane 13-5 in order to regulate the temperature between the non-limiting exemplary bounds of 15° C. and 35° C. A skilled operator may select a temperature of operation based on the available process heat 13-2 to maximize water flux through the membrane 13-5 while at the same time being below the temperature limit where increased salt passage of ions would cause downstream permeate output water 13-6 to exceed water quality guidelines. For further clarity, the advantage of this temperature control is the ability to size process equipment to a smaller bounded temperature range, rather than design and build a system that must operate at both very low and high incoming water temperature conditions, which would otherwise require substantially more membrane surface area for cold weather operation when water flux is significantly diminished, or additional downstream treatment such as another RO pass in hot weather conditions when salt passage increases may cause water quality guidelines to be exceeded. The implementation of the NF or RO based treatment may be the conventional orientation presented here in FIG. 13 or alternatively in the non-limiting example a form of multi-stage, multi-pass, semi-batch, batch, or other high recovery configuration. An additional benefit of preheating may occur by increasing the temperature of the brine concentrate 13-7 prior to some form of brine management by a thermal process such as HDH.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An integrated water, waste and energy system for relocatable or remote sites, comprising:
    a first heat pump compressor, a first heat pump evaporator, a first heat pump condenser, a first heat pump expansion valve and a first refrigerant, wherein the first heat pump evaporator is in a thermal communication with a first cooling system and the first heat pump condenser is in thermal communication with a first heating system, configured to absorb heat from the first cooling system and emit heat to a first heating system using external work provided to the first heat pump compressor;
    the first cooling system comprising a first cold thermal reservoir, a pump, and a cooling fluid, wherein the first cooling system is in thermal communication with an intermediate heat exchanger of a humidification-dehumidification system, wherein the cooling fluid absorbs heat from the intermediate heat exchanger;
    the first heating system comprising a first hot thermal reservoir, a pump, and a first heating fluid, wherein the first heating system is in thermal communication with a hot heat exchanger of the humidification-dehumidification system and a heat management system, wherein the first heating fluid first emits heat to the hot heat exchanger, the first heating fluid, thereafter containing excess process heat, emits excess heat secondly to the heat management system;
    a heat management system configured to receive and process excess heat from the first heating system, wherein the heat management system comprising:
        a plurality of sensors configured to measure water pressure, temperature and flow;
        at least one control valve configured to control movement of a thermal energy from thermal sources;

at least one thermal sink;
a thermal storage reservoir;
a plurality of heat exchangers fluidly connected to the thermal sources, to the at least one thermal sinks, to the thermal storage reservoir and to a plurality of pumps configured to circulate a heat exchange fluid between the thermal sources, thermal storage reservoir and the at least one thermal sink.

2. The system of claim 1, further comprising at least one radiator configured to radiate excess thermal energy to environment.

3. The system of claim 1, wherein the heat management system is configured to receive excess heat from at least one of a solid waste management system and or from a hybrid diesel microgrid system.

4. The system of claim 1, wherein the heat management system is configured to provide heat to an advanced water treatment utility.

5. The system of claim 1, wherein the heat management system is configured to provide heat to a water pre-treatment utility.

6. The system of claim 1, wherein the heat management system is configured to provide heat to an RO-based treatment utility.

7. The system of claim 1, wherein the thermal storage reservoir is configured to contain any of: water, propylene glycol and water mixture; and a phase change material acting as a thermal battery for the thermal storage reservoir.

8. The system of claim 1, wherein the heat exchange fluid comprises water or a mixture of propylene glycol and water.

9. The system of claim 1, wherein the heat management system is further configured to receive excess process heat from a humidification-dehumidification unit operatively connected to an RO-based treatment system.

10. The system of claim 1, further comprising a plurality of heat pumps arranged in a series-parallel configuration.

11. The system of claim 1, further comprising the heat management system configured to provide heat to a heat exchanger for an ozone and biologic biological filtration process.

12. The system of claim 1, further comprising the heat management system configured to provide heat to a heat exchanger used for pre-heating for at least one of nanofiltration or reverse osmosis process.

* * * * *